(12) United States Patent
Wuhrmann et al.

(10) Patent No.: US 10,801,881 B2
(45) Date of Patent: Oct. 13, 2020

(54) APPARATUS AND METHOD FOR CALIBRATING A WEIGH-IN-MOTION SENSOR (71) Applicant: KISTLER HOLDING AG, Winterthur (CH)

(72) Inventors: Thomas Wuhrmann, Frauenfeld (CH); Adrian Hofmann, Henggart (CH); Manuel Aeschbacher, Bern (CH)

(73) Assignee: KISTLER HOLDING AG, Winterthur (CH)

( * ) Notice: Subject to any disclaimer, the term of this patent is extended or adjusted under 35 U.S.C. 154(b) by 246 days.

(21) Appl. No.: 15/901,268

(22) Filed: Feb. 21, 2018

(65) Prior Publication Data
US 2018/0245970 A1    Aug. 30, 2018

(30) Foreign Application Priority Data
Feb. 28, 2017   (EP) .................................... 17158282

(51) Int. Cl.
*G01G 23/01*   (2006.01)
*G01G 21/26*   (2006.01)
(Continued)

(52) U.S. Cl.
CPC ............... *G01G 23/01* (2013.01); *G01G 3/13* (2013.01); *G01G 19/024* (2013.01); *G01G 19/035* (2013.01); *G01G 21/26* (2013.01)

(58) Field of Classification Search
CPC .... G01G 23/01; G01G 19/024; G01G 19/035; G01G 21/26; G01G 3/13
See application file for complete search history.

(56) References Cited

U.S. PATENT DOCUMENTS 3,976,150 A * 8/1976 Wilson ................. G01G 11/006
                                                    177/16
4,653,316 A    3/1987 Fukuhara
5,900,591 A * 5/1999 Liubakka ............. G01G 11/006
                                                    177/50

FOREIGN PATENT DOCUMENTS

CH          702963      10/2011
CN        200979453    11/2007
(Continued)

OTHER PUBLICATIONS

Korean Office Action, Korean Patent Application No. 10-2018-0024642, dated Jul. 30, 2019, and English translation thereof, 7 pages.

(Continued)

*Primary Examiner* — Randy W Gibson
(74) *Attorney, Agent, or Firm* — Dority & Manning, P.A.

(57) ABSTRACT

An apparatus for calibrating a weigh-in-motion (WIM) sensor embedded in a roadway includes an actuator, an applicator, a force sensor disposed between the actuator and the applicator, and a carriage supporting the actuator, the applicator and the force sensor, which carriage is selectively movable on a longitudinal support carried by a frame. The apparatus also includes a drive unit to move the applicator along the longitudinal support as well as a position sensor that detects a position of the calibration path relative to the WIM sensor. According to a method for calibrating a WIM sensor, the frame is positioned to straddle the WIM sensor. The applicator introduces along the calibration path at a succession of different positions, a reference force that is measured by the WIM sensor and the force sensor, and these measurements are compared to generate a calibration.

14 Claims, 5 Drawing Sheets

(51) Int. Cl.
    *G01G 19/02*    (2006.01)
    *G01G 19/03*    (2006.01)
    *G01G 3/13*     (2006.01)

(56)             References Cited

FOREIGN PATENT DOCUMENTS

| CN | 201255659      | * | 6/2009  | ............ G01G 23/01 |
| CN | 201255659      |   | 7/2009  |                         |
| DE | 3612550        |   | 10/1987 |                         |
| DE | 04304958       |   | 8/1994  |                         |
| DE | 10115490       |   | 6/2002  |                         |
| JP | H02196927      |   | 10/1987 |                         |
| KE | 10-2013-0021358|   | 3/2013  |                         |
| KR | 10-1344831     |   | 12/2013 |                         |
| RU | 2559301        |   | 8/2015  |                         |

OTHER PUBLICATIONS

Japanese Office Action, Japanese Patent Application No. 2018-033391, dated Jan. 30, 2019, and English translation thereof, 10 pages.
Chinese Office Action Original and Translation, dated Nov. 26, 2019, 14 pages.
Extended European Search Report, dated Nov. 9, 2018, 19 pages.

* cited by examiner

APPARATUS AND METHOD FOR CALIBRATING A WEIGH-IN-MOTION SENSOR

TECHNICAL FIELD

The invention relates to an apparatus for calibrating a weigh-in-motion (WIM) sensor that is inserted in a roadway and includes at least one force sensor that detects a reference force and that is calibrateable using the reference force. The invention also relates to a method for calibrating a WIM sensor that is inserted in a roadway and includes at least one force sensor that detects a reference force and that is calibrateable using the reference force.

BACKGROUND OF THE INVENTION

A WIM sensor is a force transducer that can be inserted in a roadway. By means of the WIM sensor inserted in the roadway it is possible to monitor a weight force of a vehicle travelling on the roadway. From the weight force measured, information with respect to diverse traffic parameters such as wheel load, axle load, total weight, tire pressure of the moving vehicle can be determined. In many cases, the WIM sensor is a piezoelectric force transducer measuring the weight force of the vehicle travelling with normal traffic speed over the WIM sensor. The piezoelectric force transducer generates an electrical signal that is proportional to the amount of the weight force measured and transmitted to an evaluation unit where it is evaluated. Thus, the WIM sensor and evaluation unit constitute a system for automated measuring of traffic information.

The WIM sensor is inserted in the roadway on-site which leads to differences in a quality of installation. The quality of installation is the actual state of the WIM sensor that has been inserted in the roadway. Quality of installation includes the nature of a roadway construction comprising superstructure, substructure and underground. Cavities in the road construction that are caused by water damage, for example, affect quality parameters of the WIM sensor such as its sensitivity, linearity, hysteresis, etc. However, also different installation depths of WIM sensors underneath a surface of the roadway affect the quality parameters thereof. In addition, the presence of elevations or depressions in the roadway surface influence the quality parameters. Sensitivity is the relationship between an alteration of the electrical signal emitted by the piezoelectric force transducer and an alteration of the weight force detected. Linearity is a deviation from the proportionality between the amount of the weight force captured and the electrical signal emitted by the piezoelectric force transducer. Hysteresis is a maximum difference in the electrical signal emitted by the piezoelectric force transducer for an amount of a weight force measured if the amount is achieved first with an increasing and then with a decreasing weight force.

It is desired to be able to characterize the quality of installation of the WIM sensor inserted in the roadway with high accuracy.

In addition, there is a need to measure traffic information with high accuracy to enable an overload control or a weight-based toll collection in a legally binding manner. In this respect, the International Organization of Legal Metrology (OIML) recommends in its standard OIML R-134 an accuracy of up to 0.10% for the determination of the total weight of the moving vehicle. This requires calibration of the WIM sensor inserted in the roadway.

Such a method for the calibration of a WIM sensor inserted in a roadway is disclosed in the document CH702963A1. For this purpose, a calibration vehicle that includes a dynamometer is moved over the WIM sensor. The dynamometer is mounted on a wheel of the calibration vehicle. While the dynamometer is moved over the WIM sensor it measures a wheel force acting on the wheel in a time- or position-dependent manner while the WIM sensor captures a weight force of the calibration vehicle. The measurement of the wheel force by the dynamometer is significantly more accurate than the measurement of the weight force by the WIM sensor. The dynamometer transmits wheel force data corresponding to the wheel force measured and the WIM sensor transmits weight force data corresponding to the weight force measured, said data being compared to each other in an evaluation unit. From this comparison, a calibration function of the WIM sensor is determined.

It has been found that the calibration method disclosed in the document CH702963A1 depends on the condition of the roadway. The road surface is subject to wear. Potholes and ruts in the roadway in the vicinity of the WIM sensor may invalidate the calibration function in which case the calibration function will become inaccurate. Then, the calibration process must be repeated making it time-consuming.

In addition, document CH702963A1 mentions the possibility to measure axle deformations of the calibration vehicle and to put these axle deformations measured into relation to the weight of the calibration vehicle. However, this requires a calibration of the calibration vehicle itself, a time-consuming and costly process.

Thus, a need exists for an apparatus that is able to calibrate the WIM sensor inserted in the roadway with high accuracy. A need also exists for a method by which the WIM sensor inserted in the roadway can be calibrated with high accuracy.

BRIEF SUMMARY OF EXEMPLARY EMBODIMENTS OF THE INVENTION

The invention relates to an apparatus for calibrating a weigh-in-motion (WIM) sensor inserted in a roadway, said apparatus comprising at least one force sensor wherein said force sensor detects a reference force and wherein said WIM sensor is calibrateable with respect to said reference force; said apparatus comprising an applicator said applicator being adapted to introduce the reference force into the roadway; said apparatus comprises an actuator, wherein said actuator generates the reference force; and wherein said actuator, force sensor and applicator are mechanically connected to each other forming a carriage.

In the prior art described in document CH702963A1, a wheel force acting on a wheel of a calibration vehicle is detected and a WIM sensor is calibrated by means of the weight of the calibration vehicle. This prior art assumed that the wheel force and the weight of the calibration vehicle have a fixed relationship to each other. However, this assumption is imprecise and to that extent misleading when it comes to performing a calibration. For one thing, it now has been found that the wheel force depends on the condition of the road and may change in the presence of potholes, ruts, and also depending on the nature of the road surface. In addition, vibrations of the calibration vehicle have proved to be detrimental for the calibration because these vibrations manifest as a disturbance force superimposed both on the wheel force detected and the weight force measured.

This is addressed by the apparatus of the invention in which an actuator generates a reference force with high accuracy. The reference force generated is detected with high accuracy by a force sensor and introduced into the roadway with high accuracy by an applicator. For this purpose, the actuator, force sensor, and applicator are mechanically connected to each other forming a carriage. Thus, generating, detecting and introducing the reference force is performed simultaneously and with high accuracy in one carriage.

The invention also relates to a method for calibrating a weigh-in-motion (WIM) sensor inserted in a roadway. The WIM sensor is calibrated along a calibration path wherein a reference force is detected by at least one force sensor; said reference force is introduced into the roadway along the calibration path by an applicator; wherein the reference force is detected by the WIM sensor as a weight force at the site of installation of the WIM sensor; and wherein the weight force measured by the WIM sensor is compared to the reference force detected; wherein a position on the calibration path relative to the installation site of the WIM sensor is detected by at least one position sensor; and wherein the applicator is moved along the calibration path by a drive unit.

In an embodiment of the calibration method according to the invention, a position on the calibration path relative to the installation site of the WIM sensor that is to be calibrated is measured with high accuracy by a position sensor. Subsequently, a reference force is introduced into the roadway along the calibration path by an applicator. Thus, the position on the calibration path is detected with high accuracy and, therefore, also a quality of installation of the WIM sensor inserted in the roadway is characterized with high accuracy by the force sensor and the WIM sensor. In this way, the method according to the invention makes it possible to detect an installation site of the WIM sensor with an accuracy in the millimeter range and to move the applicator with an accuracy in the millimeter range relative to the installation site of the WIM sensor. If there is an elevation or a depression in the roadway surface at the installation site of the WIM sensor, this will be detected by the force sensor and the WIM sensor with an accuracy in the millimeter range and taken into account as such in the calibration. In the prior art described in document CH702963A1, a position resolution of a calibration vehicle is performed by means of GPS signals achieving a significantly lower accuracy.

BRIEF DESCRIPTION OF THE DRAWINGS

Exemplary embodiments of the invention will be explained with reference to the following Figures in which.

DETAILED DESCRIPTION OF EXEMPLARY EMBODIMENTS OF THE INVENTION

Figure 1:
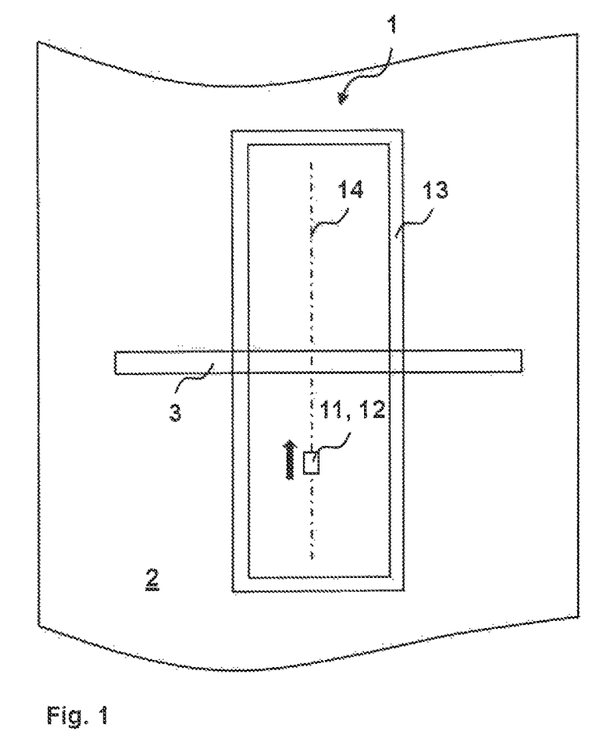
FIG. 1 shows a schematic view of a presently preferred embodiment of an apparatus for calibrating along a direction of travel a WIM sensor inserted in a roadway.
Figure 2:
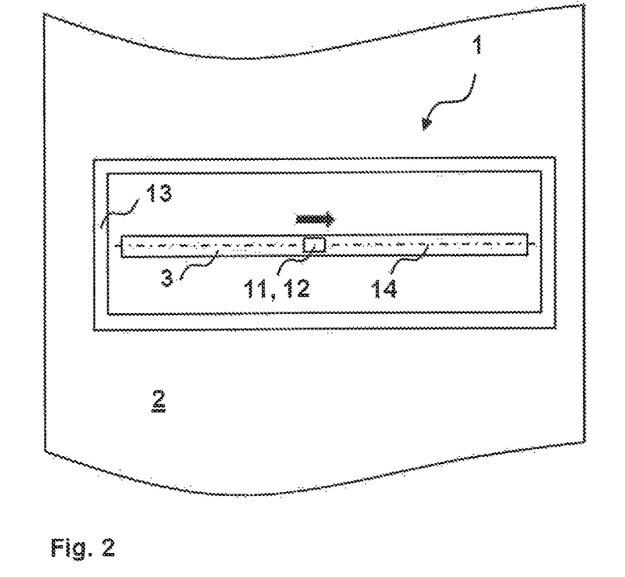
FIG. 2 shows a schematic view of the apparatus according to FIG. 1 in which the WIM sensor is calibrated along a longitudinal direction of the sensor.

FIGS. 1 and 2 show two schematic views of a presently preferred exemplary embodiment of an apparatus 1 for calibrating a WIM sensor 3 inserted in a roadway 2. On the roadway 2, vehicles are travelling in a direction of travel indicated by the solid, bold arrow pointing from the bottom to the top of the page, or in the opposite direction. The roadway 2 comprises a surface that consists of mechanically resistant material such as asphalt, concrete, etc.

Figure 9:
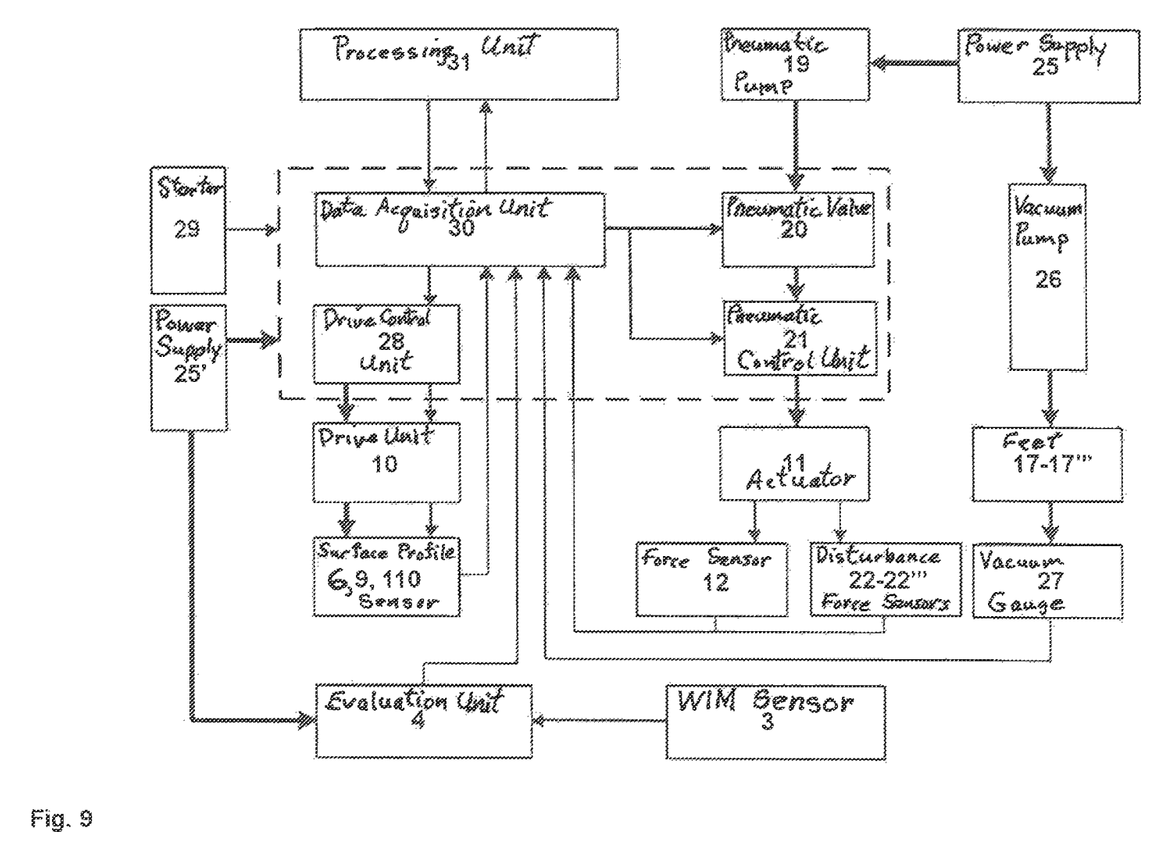
FIG. 9 shows a schematic representation of the apparatus according to FIGS. 1 to 4 for calibrating a WIM sensor inserted in a roadway.

Preferably, the WIM sensor 3 is a piezoelectric force transducer generating electrical signals that are proportional to an amount of a weight force measured by the WIM sensor 3. WIM sensor 3 desirably comprises a plurality of piezoelectric transducer elements aligned in a longitudinal direction of the sensor 3. As shown in FIG. 1 for example, the longitudinal direction of the WIM sensor 3 desirably perpendicular to the direction of travel. Adjacent piezoelectric transducer elements desirably are arranged spaced apart at a distance of 80 mm to 120 mm. Preferably, detection of the weight force by the piezoelectric transducer elements is carried out with a time resolution of less than 1 kHz. As schematically shown in FIG. 9, the electrical signals so generated by the piezoelectric transducer elements of the WIM sensor 3 are transmitted to an evaluation unit 4 where they are evaluated by the evaluation unit 4. This is represented in the schematic view of the apparatus 1 according to FIG. 9 by the arrow pointing from the rectangle representation of the WIM sensor 3 to the rectangle representing the evaluation unit 4.

WIM sensor 3 is embedded in a groove in the roadway 2 and sealed with a covering agent. The dimensions of the groove are such that the WIM sensor 3 is completely accommodated therein. The groove extends below a surface of the roadway 2 in the longitudinal direction of the sensor either vertically or in an angle to the direction of travel. Preferably, the WIM sensor 3 has a length of 1000 mm or more in the longitudinal direction of the sensor 3 while the WIM sensor 3 has a width of around 30 mm to 50 mm in the direction of travel and a height of 20 mm to 70 mm in a vertical direction. The covering agent covers the WIM sensor 3 and is flush with a surface of the roadway 2. The term flush in the sense of the invention means that the covering agent does not protrude over the surface of the roadway 2. The vertical direction is perpendicular to the surface of the roadway 2. The WIM sensor 3 is completely embedded in the roadway 2, and in the vertical direction the uppermost surface of the sensor is positioned approximately 50 mm below the surface of the roadway 2. The covering agent differs from the surface in color and also in chemical nature so that a site of installation of the WIM sensor 3 in the roadway 2 is easily identified by means of the covering agent. In FIGS. 1 to 4, the longitudinal direction of the sensor is perpendicular to the direction of travel. Once a person skilled in the art has received knowledge of the present invention, such person also understands that WIM sensors 3 with different shapes, lengths and widths are within the scope of the invention. For example, the WIM sensor 3 can be rectangular in shape having a width of 200 mm to 800 mm, a length of 200 mm up to 800 mm, and a height of 20 mm to 70 mm. Furthermore, the WIM sensor can be circular with a diameter of 200 mm to 800 mm and a height of 20 mm to 70 mm. Moreover, the WIM sensor 3 may be embedded in the groove in the roadway 2 without being sealed by a covering agent. Instead of a covering agent, the WIM sensor 3 can be provided with a covering plate that is flush with the roadway surface. The WIM sensor 3 can be a dynamometer.

The apparatus 1 is assembled on the roadway 2 at the WIM sensor 3 to be calibrated and is disassembled from the roadway 2 after the WIM sensor 3 has been calibrated. To do this, apparatus 1 is transported to and from the place of use on a transport vehicle (not shown), which can be a flatbed truck for example. The roadway 2 cannot be used for vehicle traffic during calibration. When the apparatus 1 is deployed in use for performing a calibration of the WIM sensor, only a few components of the apparatus 1 will be placed on the roadway 2 while the majority of the components of the apparatus 1 can remain placed on the transport vehicle. Thus, the apparatus 1 is configured for rapid assembly and disassembly. Among the few components of the apparatus 1 placed on the roadway 2 are a frame 13 and an actuator 11 and at least one force sensor 12 arranged on the frame 13 so that only the frame 13 will be placed on the roadway 2. Further components of the apparatus 1 such as a data acquisition unit 30, a processing unit 31, a pneumatic pump 19, at least one electric power supply 25, 25', a vacuum pump 26, etc., which are schematically shown in FIG. 9, need not be placed on the roadway 2 for the apparatus 1 to perform a calibration and thus can remain carried by the transport vehicle.

The frame 13 desirably is made of mechanically resistant material such as pure metals, aluminum alloys, nickel alloys, cobalt alloys, iron alloys, etc. As schematically shown in perspective views in FIGS. 3 and 5 for example, the frame 13 comprises a base 131 and a longitudinal support 132. Relative to the roadway 2, the base 131 is arranged below longitudinal support 132. In the top view, the base 131 is preferably rectangular in shape. As schematically shown in FIGS. 1 and 2, when the apparatus 1 is to be deployed in use on the surface portion of the roadway 2 to perform a calibration, a surface portion of the roadway 2 at the site of installation of the WIM sensor 3 is enclosed by frame 13, which is preferably rectangular in shape.

Figure 3:
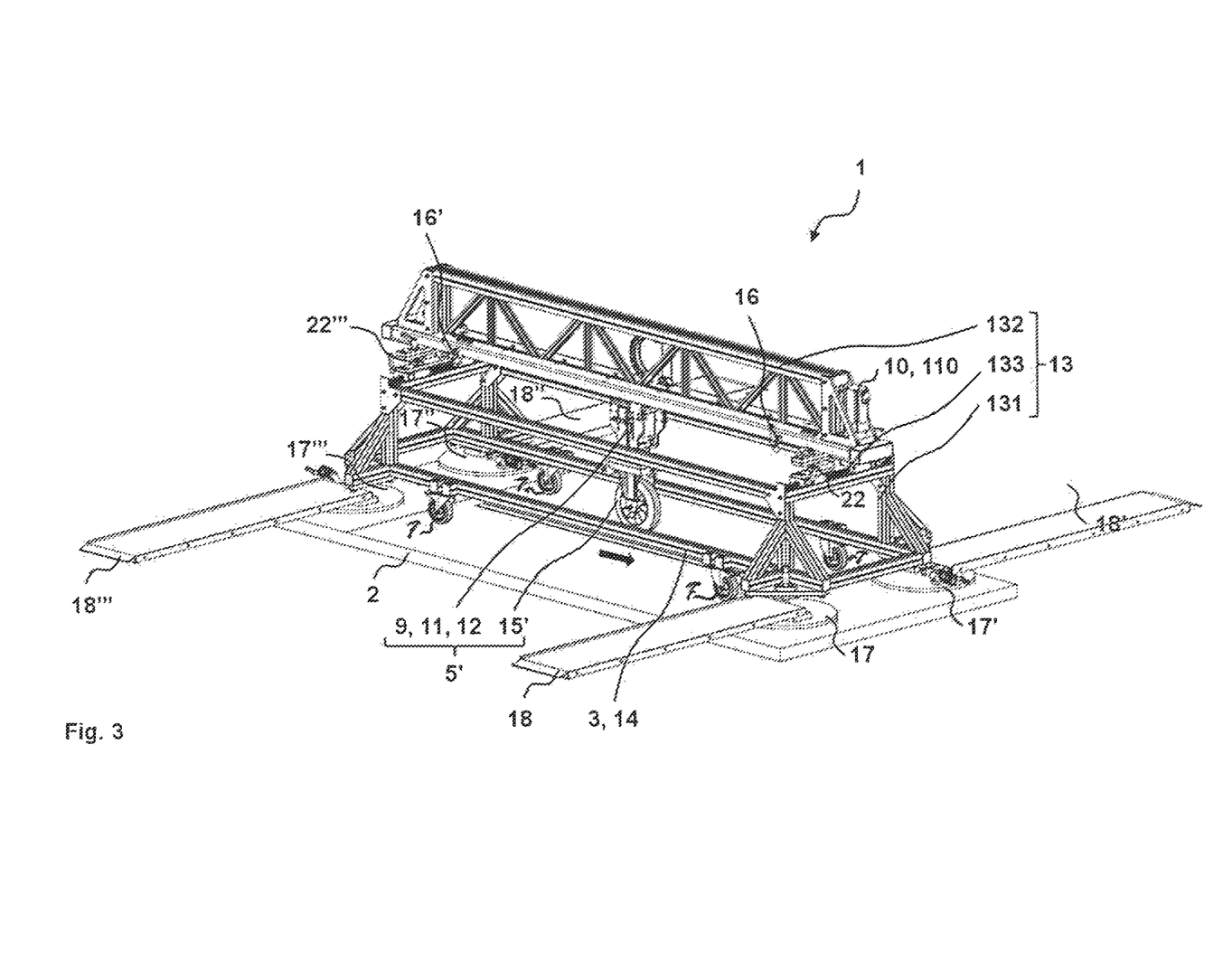
FIG. 3 shows a perspective view of a portion of the apparatus according to FIG. 1 or 2 in which the WIM sensor is calibrated along the longitudinal direction of the sensor.
Figure 4:
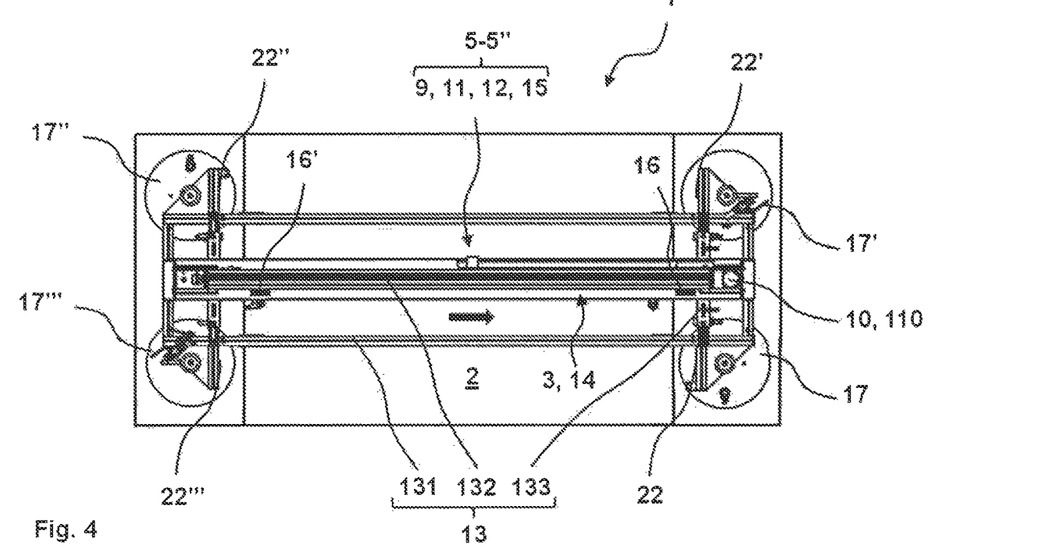
FIG. 4 represents a top view of a portion of the apparatus according to FIGS. 1 to 3 in which the WIM sensor is calibrated along the longitudinal direction of the sensor.

As schematically shown in FIG. 3, the base 131 desirably comprises a plurality of wheels 7 by which it can be moved on the roadway 2. As schematically shown in FIGS. 3 and 4, base 131 comprises a plurality of feet 17, 17', 17", 17''', etc. by which the base 131 is placed at rest on the roadway 2. Four feet 17, 17', 17", 17''' desirably can be used to carry the base 131 and rest on the roadway 2. After the base 131 has been placed on the roadway 2 by means of the feet 17-17''', the base 131 no longer can be moved around on the roadway 2. In the embodiment depicted in FIGS. 3 and 4, one of the four feet 17, 17', 17", 17''' is positioned at one the four corners of the rectangular-shaped base 131.

To immobilize the base 131 on the roadway 2 fixing weights can be attached to apparatus 1. As schematically shown in FIG. 3 for example, apparatus 1 desirably comprises a plurality of cantilever arms 18, 18', 18", 18''', etc. by which fixing weights can be attached directly to the base 131 and/or to the feet 17, 17', 17", 17'''. As shown in FIG. 3, a respective cantilever arm 18, 18', 18", 18''' is placed at each respective foot 17, 17', 17", 17'''. Each respective one of the cantilever arms 18, 18', 18", 18''' is weighted by fixing weights (not shown in the Figure). For example, the fixing weights can be provided by parking on one set of the cantilever arms 18, 18''', the vehicle that transports the apparatus 1 to the calibration site for the WIM sensor 3 and parking on the other set of the cantilever arms 18', 18", a second vehicle that accompanies the vehicle that transports the apparatus to the WIM sensor 3.

Alternatively or in addition to the cantilever arms 18, 18', 18", 18''', the base 131 also can be immobilized on the roadway 2 by a vacuum between the feet 17, 17', 17", 17''' and the roadway 2. For this purpose, each foot 17, 17', 17", 17''' is equipped with a sealing member (not visible in the view shown in FIGS. 3 and 4) on a side facing the roadway 2 for sealing a cavity between each foot 17, 17', 17", 17''' and the roadway 2 in a gas-tight manner. As schematically shown in FIG. 9, a vacuum is generated in each cavity by means of vacuum pump 26. The vacuum is measured by a vacuum gauge 27. As schematically shown in FIG. 9, the vacuum gauge 27 emits electrical signals corresponding to the amount of vacuum measured and communicates the signals to a data acquisition unit 30. A vacuum of less than 700 mbar causes firm adhesion of the feet 17, 17', 17", 17''' to the roadway 2 with a force of several kN per foot 17, 17', 17", 17'''. In this way, a counterforce is generated that is large enough to compensate for the reference force so that the base 131 is immobilized on the roadway 2. This is represented in more detail in the schematic view of the apparatus 1 shown in FIG. 9.

The direction in which the WIM sensor 3 is calibrated is referred to as the calibration direction. In FIGS. 1 to 4, the direction of calibration is indicated by a bold arrow. As schematically shown in FIG. 1, the calibration direction extends parallel to the direction of travel, and the WIM sensor 3 is calibrated along the direction of travel. As shown in FIG. 2, the calibration direction extends parallel to the longitudinal direction of the sensor, and thus the WIM sensor 3 is calibrated along the longitudinal direction of the sensor. A path along which the WIM sensor 3 is calibrated in the calibration direction is referred to as a calibration path 14. In FIGS. 1 and 2, the calibration path 14 is drawn as a dashed-dotted line. In both instances, the calibration path 14 is enclosed by the frame 13. Thus, the calibration of the WIM sensor 3 inserted in the roadway 2 is performed within the frame 13.

Figure 5:
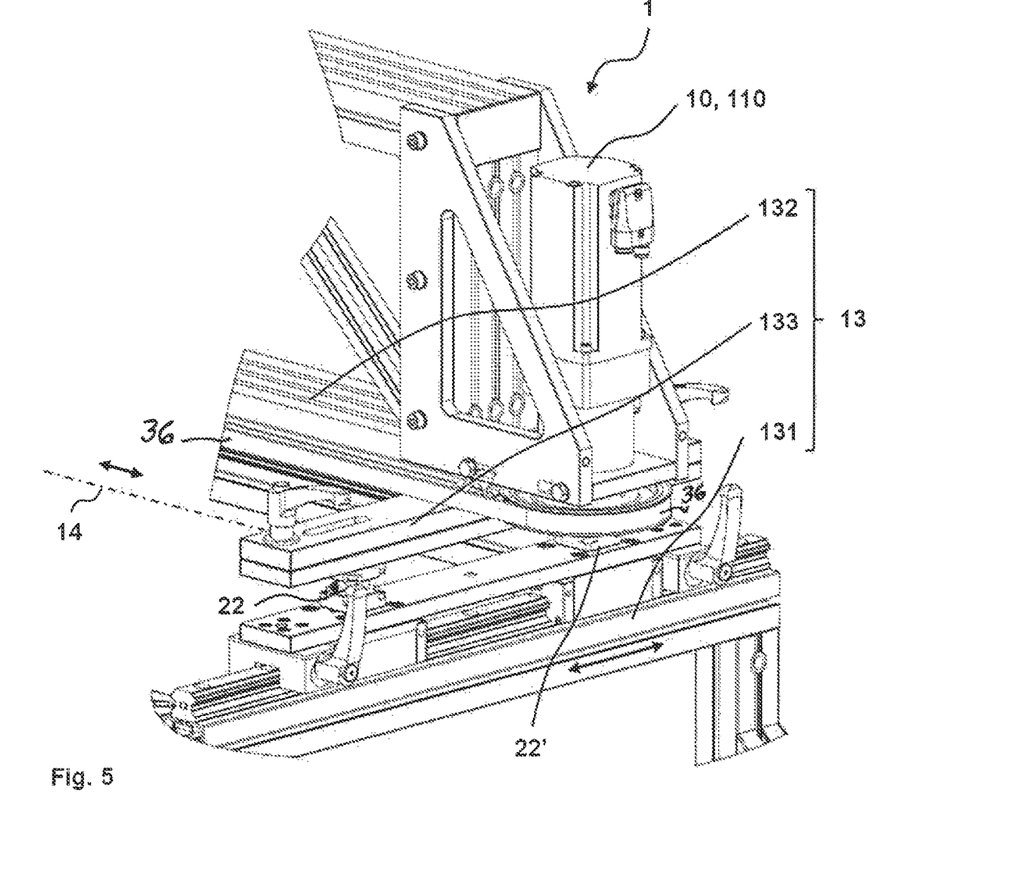
FIG. 5 shows a perspective view of a portion of a guide for a longitudinal support with respect to a base of a frame of the apparatus according to FIGS. 1 to 4.

As schematically shown in FIG. 3, the longitudinal support 132 extends parallel to the calibration path 14. As schematically shown in FIGS. 4 and 5, the frame 13 includes a guide 133 for positioning the calibration path 14 relative to the installation site of the WIM sensor 3. As schematically shown in FIG. 5, the guide 133 is disposed between the longitudinal support 132 and the base 131. The guide 133 is configured to implement movement of the longitudinal support 132 across the base 131. Details are shown in FIG. 5. As schematically shown in FIG. 5, the guide 133 comprises at least one slide that is movable in a direction perpendicular to the direction of calibration. Preferably, the slide is movably guided on a profile. On the slide, the longitudinal support 132 can be moved by +/−100 mm perpendicularly to the direction of calibration relative to the base 131 that is placed at the installation site of the WIM sensor 3. This is shown in FIG. 5 by the longer double arrow. The slide can be manually fixed in a desired position by means of locking levers.

Guide 133 further comprises at least one longitudinal adjustment means by which the longitudinal support 132 is movable in the direction of calibration and opposite the direction of calibration. Preferably, the longitudinal adjustment means includes two profiles lying on top of one another and moving against each other. The two profiles can be secured in a desired position via screw connections. Longitudinal support 132 can be moved by +/−10 mm in the direction of calibration by the longitudinal adjustment means relative to the base 131 that is placed at the installation site of the WIM sensor 3. This is indicated in FIG. 5 by a shorter double arrow. Furthermore, the longitudinal adjustment means is configured so that the longitudinal support 132 may be moved so as to be disposed at an acute angle relative to the direction of calibration. The guide 133 makes it possible to move the longitudinal support 132 relative to a desired position with an accuracy of less than 1.0 mm relative to the installation site of the WIM sensor 3.

As schematically shown in FIGS. 3 and 4, the apparatus 1 comprises at least one position sensor 16, 16' that is configured and disposed for detecting the position of the calibration path 14 relative to the installation site of the WIM sensor 3. Preferably, the position sensor 16, 16' is a light emitter such as a light-emitting diode, a laser diode, etc. The position sensor 16, 16' emits light in the visible range in the form of a beam having a diameter of less than 1.0 mm. Preferably, the position sensor 16, 16' is attached to the longitudinal support 132 in a rigid manner, and a projection of the light beam on the roadway 2 defines a position of the calibration path 14. The longitudinal support 132 is moved in such a way that the projection of the light beam coincides with the site of installation of the WIM sensor 3. As shown in FIGS. 3 and 4, two position sensors 16, 16' are attached to the longitudinal support 132 and spaced apart at a distance from each other. Thus, the projections of the light beams of the two position sensors 16, 16' on the roadway 2 are spaced apart from each other and define two spatially separated positions on the calibration path 14. Preferably, the projection of the light beam of a first position sensor 16 defines a starting position of the calibration path 14 on the roadway 2, and the projection of the light beam of a second position sensor 16' defines an end position of the calibration path 14 on the roadway 2. When these two light beam projections coincide with the site of installation of the WIM sensor 3, a starting position and an end position of the calibration path 14 relative to the installation site of the WIM sensor 3 have been detected. Detecting the position of the calibration path 14 relative to the installation site of the WIM sensor 3 is carried out with an accuracy of less than 1.0 mm. A person skilled in the art and knowing the present invention also may provide more than two position sensors 16, 16'. In addition, the skilled person also can detect the position of the calibration path 14 relative to the installation site of the WIM sensor 3 by the use of only a single position sensor 16 that can be repositioned along the longitudinal support 132 to make the two separate starting and ending positions of the calibration path 14 relative to the installation site of the WIM sensor 3. This single position sensor 16 can be repositioned along a sensor guide (not shown) on the longitudinal support 132 in a movable manner whereby the position sensor 16 guided by the sensor guide can be used to define spatially separated positions (starting and ending) on the calibration path in a plurality of spatially separated arrangements on the longitudinal support 132.

The actuator 11 generates a reference force serving to calibrate the WIM sensor 3. Preferably, the actuator 11 is a pneumatic cylinder depicted in each of FIGS. 6, 7 and 8. As schematically shown in FIG. 9, the apparatus 1 comprises a pneumatic pump 19, pneumatic valve 20 and pneumatic control unit 21 for actuating and controlling the actuator 11. The pneumatic pump 19 produces compressed air that flows into an inlet via the pneumatic valve 20, which can open and close the access of the compressed air to the inlet. Compressed air is supplied to the pneumatic cylinder via the inlet. The pneumatic control unit 21 controls the time duration of the supply during which the compressed air is supplied to the pneumatic cylinder as well as the amount of compressed air that is supplied to the pneumatic cylinder during this duration of time. Pressurizing the pneumatic cylinder generates the reference force that is used by the apparatus 1 for the calibration of the WIM sensor 3. Preferably, the reference force is from 100 N up to 10 kN. The reference force is generated with an accuracy of less than 0.01%. With this accuracy, the reference force is constant over a period from 1 msec to 100 sec.

The force sensor 12 detects the reference force that is used by the apparatus 1 for the calibration of the WIM sensor 3. Preferably, the pneumatic cylinder acts directly on the force sensor 12. Preferably, the force sensor 12 is a piezoelectric force transducer generating electrical signals that are proportional to the amount of the reference force measured by the force sensor 12. The force sensor 12 desirably is configured to detect the reference force with an accuracy of less than 0.01% and with a time resolution of less 1 kHz. Thus, the accuracy both in generating and detecting the reference force is at least one order of magnitude higher than the accuracy recommended in the standard OIML R-134 for determining the weight force of a moving vehicle.

To account for any disturbance force that acts on the frame 13 during calibration of the WIM sensor 3 inserted in the roadway 2, the apparatus 1 preferably comprises at least one disturbance force sensor 22. The disturbance force may include a component that originates from a vibration generated by a drive unit 10. The disturbance force also may include a component that originates from a reaction force generated by a wheel of an applicator 15, 15' rolling on the roadway 2. Furthermore, the disturbance force may include a component that originates from mechanical impacts that occur because a wheel of an applicator 15, 15' rolls over bumps in the roadway 2.

As schematically shown in FIGS. 4 and 9 an embodiment of the apparatus 1 that includes four disturbance force sensors 22, 22', 22", 22''' is desirable. Each of the disturbance force sensors 22, 22', 22", 22''' is attached to the frame 13 and measures a disturbance force. As shown in FIGS. 3 to 5, four disturbance force sensors 22, 22', 22", 22''' are attached in the portion of the guide 133 that extends between the longitudinal support 132 and the base 131. Preferably, each disturbance force sensor 22, 22', 22", 22''' includes a piezoelectric force transducer generating an electrical signal that is proportional to the amount of the disturbance force detected. The four disturbance force sensors 22, 22', 22", 22''' are arranged on the frame 13 spaced apart from each other and form a dynamometer. This dynamometer not only detects multiple components of a disturbance force but also multiple components of disturbance moments. The disturbance force sensor 22, 22', 22", 22''' measures the disturbance force with an accuracy of less than 0.01% and with a time resolution of less 1 kHz. Instead of using an array of disturbance force sensors 22, 22', 22", 22''' attached to the frame as shown in FIGS. 3 to 5, those skilled in the art knowing the present invention also can use a disturbance force sensor in the form of a dynamometer that is attached to the carriage described hereinafter.

Figure 6:
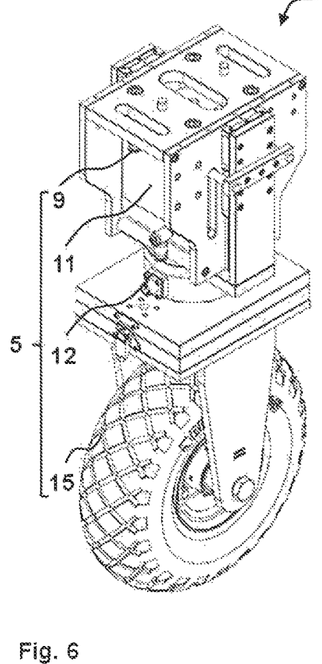
FIG. 6 shows a perspective view of a portion of a first embodiment of a carriage comprising an applicator equipped with wide wheels of the apparatus according to FIGS. 1 to 4.
Figure 7:
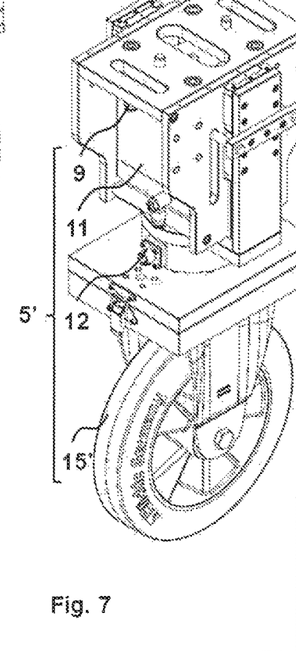
FIG. 7 shows a perspective view of a portion of a second embodiment of a carriage comprising an applicator equipped with narrow wheels of the apparatus according to FIGS. 1 to 4.
Figure 8:
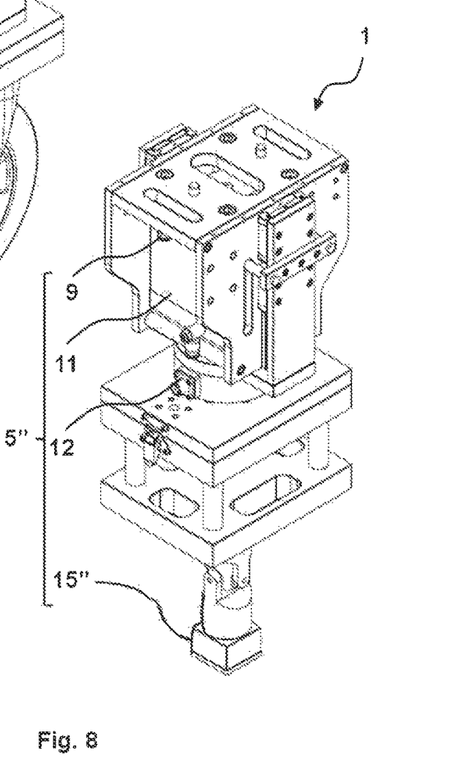
FIG. 8 shows a perspective view of a portion of a third embodiment of a carriage comprising an applicator in the shape of a punch of the apparatus according to FIGS. 1 to 4.

The apparatus 1 comprises at least one applicator 15, 15', 15" for introducing the reference force into the roadway 2. Each of FIGS. 6, 7 and 8 depicts an alternative embodiment of a suitable applicator 15, 15', 15". Preferably, the pneumatic cylinder of the actuator 11 acts directly onto the applicator 15, 15', 15". As shown in FIGS. 6, 7 and 8, actuator 11, force sensor 12 and applicator 15, 15', 15" are mechanically connected to each other forming a carriage 5, 5', 5". In this respect, FIGS. 6 to 8 show three different embodiments of a carriage 5, 5', 5", each comprising a different respective applicator 15, 15', 15".

According to FIG. 6, the applicator 15 is wide-wheeled and comprising a wide wheel. The wide wheel is 100 mm to 200 mm wide. The wide wheel is significantly wider than the width of the WIM sensor 3 in the direction of travel. Furthermore, the wide wheel is significantly wider than the spacing between adjacent piezoelectric transducer elements in the WIM sensor 3.

According to FIG. 7, the applicator 15' is narrow-wheeled having a narrow wheel. The narrow wheel is from 30 mm up to 50 mm wide. Thus, the width of the narrow wheel is identical to that of the WIM sensor 3 in the direction of travel. Further, the narrow wheel is narrower than the spacing between adjacent piezoelectric transducer elements in the WIM sensor 3.

According to FIG. 8, the applicator 15" has the shape of a punch comprising a rectangular punch. A linear dimension of the punch 15" is 30 mm to 50 mm in a direction that is parallel to the surface of the roadway 2. This linear dimension of the punch 15" desirably is identical to the width of the WIM sensor 3 in the direction of travel. This linear dimension of the punch 15" desirably is narrower than the spacing between adjacent piezoelectric transducer elements in the WIM sensor 3.

With regard to the roadway 2, the carriage 5, 5', 5" is arranged below the longitudinal support 132 as shown in FIG. 3. The longitudinal support 132 comprises a guide rail along which the carriage 5, 5', 5" is mounted and carried and slidably movable along the guide rail along the calibration path 14. Thus, the carriage 5, 5', 5" can be moved along the roadway 2 within the surface portion that is enclosed by the base 131. Persons on the roadway 2 are spatially separated from the carriage 5, 5', 5" by the base 131 ensuring the safety of the persons during calibration of the WIM sensor 3.

The apparatus 1 comprises a drive unit 10 for moving the carriage 5, 5', 5", Preferably, the drive unit 10 is an electric drive such as an asynchronous motor. As schematically shown in FIG. 9, the drive unit 10 is controlled by a drive control unit 28. As shown in FIG. 5, the drive unit 10 is attached to one end of the longitudinal support 132 and mechanically connected to the carriage 5, 5', 5" via a belt 36. In this way, a rotation of a shaft of the drive unit 10 brings about a translation of the carriage 5, 5', 5". A driving force generated by the drive unit 10 is transferred to the carriage 5, 5', 5" via the belt 36. Preferably, the carriage 5, 5', 5" is moved along the calibration path 14 with a speed of up to 1.0 m/sec. Preferably, carriage 5, 5', 5" is accelerated and decelerated along the calibration path 14 with an acceleration of up to 1.0 m/sec².

Thus, the reference force is introduced into the roadway 2 in a continuous manner by continuously rolling the wheel of the applicator 15, 15' along the calibration path 14.

Alternatively, the reference force is introduced into the roadway 2 in a discontinuous manner by discontinuously putting down along the calibration path 14 the punch embodiment of the applicator 15" depicted in FIG. 8. If the reference force is introduced in a discontinuous manner, the punch of the applicator 15" will be positioned at several discrete calibration positions along the calibration path 14. These discrete and separate calibration positions have a predefined distance between one another. Preferably, the reference force is introduced into the roadway 2 only at each of the discrete calibration positions. In between the successive introductions of the reference force, the applicator 15" is moved from one discrete calibration position to the next successive discrete calibration position without applying a reference force. In this way, the punch of the applicator 15" is positioned so as to engage different piezoelectric transducer elements of the WIM sensor 3 and each of the different piezoelectric transducer elements is calibrated individually against a pre-defined reference force ramp. The reference force ramp consists of a plurality of reference forces with different magnitudes. Preferably, the magnitudes of the reference forces included in a reference force ramp vary within about one order of magnitude. The reference force ramp is varied upwards or downwards. In this way, a sensitivity, a linearity and a hysteresis will be characterized for each piezoelectric transducer element.

Preferably, as schematically shown in FIGS. 3, 4 and 5, the drive unit 10 comprises an incremental encoder 110 mounted on the shaft of the drive unit 10. The incremental encoder 110 is configured and disposed to detect angular positions of the shaft of the drive unit 10 when the carriage 5, 5', 5" is moved along the calibration path 14. The incremental encoder 110 measures angular positions with an angular resolution of less than 1 degree and a time resolution of less 1 kHz. The movement of the carriage 5, 5', 5" along the calibration path 14 can thus be measured with a position resolution of less than 1.0 mm. To define a reference position for the incremental encoder 110, the carriage 5, 5', 5" is moved to a position transducer 6 at the beginning or at the end of the calibration path 14. The position transducer 6 detects the carriage 5, 5', 5" in the reference position on the calibration path 14. As schematically shown in FIG. 9, the electrical signals corresponding to the angles measured by the incremental encoder 110 are emitted to the data acquisition unit 30. Furthermore, the data acquisition unit 30 receives an electrical signal corresponding to the reference position measured by the position transducer 6. By evaluating the angular positions measured at different times at different positions of the calibration path 14, the movement of the carriage 5, 5', 5" is measured in a position-resolving manner. Evaluation of the reference position measured gives an absolute position of the carriage 5, 5', 5" along the calibration path 14. The position transducer 6 may be an inductive transducer, a magnetic transducer, a mechanical stop, etc. If the position transducer 6 includes a mechanical stop such as the base 131, then the incremental encoder 110 detects the absence of further movement of the carriage 5, 5', 5" due to an encounter with the base 131. As schematically shown in FIG. 9, the position of the carriage 5, 5', 5" at this encounter with the base 131 is interpreted by the processing unit 31 as a reference position.

Preferably, the carriage 5, 5', 5" comprises at least one surface profile sensor 9. The surface profile sensor 9 measures a surface profile of the roadway 2 along the calibration path 14. The surface profile shows elevations or depressions in the surface of the roadway 2. As shown in FIGS. 6, 7 and 8, the surface profile sensor 9 is firmly attached to the carriage 5, 5', 5". The surface profile sensor 9 desirably comprises at least one optical sensor such as a laser diode, light-emitting diode, etc., which is a light emitter. The light emitter of the optical sensor 9 is configured and disposed so as to emit a beam of light directed onto the calibration path 14. The beam of light is reflected from the surface of the roadway 2 at the calibration path 14. The optical sensor constituting the surface profile sensor 9 further comprises at least one light receiver such as a photodiode, a photo resistor, etc. The light receiver is also directed to the calibration path 14 and measures the returning light beam reflected at the surface of the roadway 2 on the calibration path 14. If a distance of the surface profile sensor 9 to the surface of the roadway 2 on the calibration path 14 is altered due to elevations or depressions in the surface of the roadway 2, then this distance deviation will also alter an angle at which the returning reflected light beam is detected. During moving of the carriage 5, 5', 5" along the calibration path 14, the surface profile sensor 9 will thus measure an alteration in the distance with a distance resolution of less than 1 mm and with a time resolution of less 1 kHz. As schematically shown in FIG. 9, the surface profile sensor 9 emits to the data acquisition unit 30 electrical signals that correspond to the measured alteration in distance. The data acquisition unit 30 provides the signals to the processing unit 31 for evaluating the alteration of the distance measured at different positions of the calibration path 14, thereby to determine with high precision the surface profile of the roadway 2 along the calibration path 14.

If the processing unit 31 determines that the surface profile comprises elevations or depressions larger than a predefined threshold value, then the processing unit 31 may be programmed to generate instructions that there is a need of reworking the installation site of the WIM sensor 3 in the roadway 2. The surface profile of the roadway 2 can be determined by the processing unit 31 in a two-dimensional or a three-dimensional manner. In the case of a two-dimensional surface profile the alteration in the distance to the surface of the roadway 2 is measured on a line along the calibration direction. In case of a three-dimensional surface profile, the alteration in distance to the surface of the roadway 2 over a width of the roadway 2 along the calibration direction is detected. Preferably, the width of the roadway 2 is at least as wide as the width of the WIM sensor 3.

As schematically shown in FIG. 9, at least one power supply 25, 25' generates electric power that is supplied to the apparatus 1 so that it can be operated independently. Preferably, a first power supply 25 generates three-phase electric power for the pneumatic pump 19 and the vacuum pump 26, while a second power supply 25' generates single-phase electric power for the drive unit 10, the drive control unit 28, the data acquisition unit 30 and the processing unit 31. Details are shown in the schematic view of the apparatus 1 according to FIG. 9.

As schematically shown in FIG. 9, calibration of the WIM sensor 3 inserted in the roadway 2 is started and stopped by a starter 29. The starter 29 also works as a dead man's control checking whether a person to operate the apparatus 1 is present and able to act.

As schematically shown in FIG. 9, the data acquisition unit 30 acquires digital data from the evaluation unit 4 regarding the amount of weight force detected by the WIM sensor 3. From the incremental encoder 110, the data acquisition unit 30 receives electrical signals regarding the angular position of the shaft of the drive unit 10. From the position transducer, the data acquisition unit 30 receives an electrical signal regarding the reference position of the carriage 5, 5', 5" on the calibration path 14. From the surface profile sensor 9, the data acquisition unit 30 receives electrical signals relating to the alteration of the distance detected by the surface profile sensor 9. From the force sensor 12, the data acquisition unit 30 receives electrical signals regarding the reference force measured by the force sensor 12. From the disturbance force sensor 22, 22', 22", 22''', the data acquisition unit 30 receives electrical signals regarding the disturbance force measured by the disturbance force sensor 22, 22', 22", 22'''. From the vacuum gauge 27, the data acquisition unit 30 receives electrical signals indicative of the amount of vacuum measured by the vacuum gauge 27. The electrical signals measured can be electrically amplified and converted into digital data by the data acquisition unit 30.

The processing unit 31 is a computer comprising a data memory and processor. Stored in the data memory of the processing unit 31 is at least one evaluation program that is being executed by the processor. The data acquisition unit 30 communicates with the processing unit 31. Thus, the data acquisition unit 30 delivers to the processing unit 31 digital data that are evaluated in the evaluation program stored in the data memory of the processing unit 31. The evaluation program compares digital data regarding the weight force measured by the WIM sensor 3 to the reference force measured by the force sensor 12. The evaluation program determines a surface profile of the roadway 2 along the calibration 14 from the digital data corresponding to the alterations in the distance from the surface profile sensor 9 to the surface of the roadway 2 at different positions of the calibration path 14.

The evaluation program compares digital data corresponding to the measured weight force to digital data corresponding to the measured reference force. A result of the comparison is a calibration value or a calibration function. In this comparison, the evaluation program also takes into account digital data both of the disturbance force and the surface profile measured. Digital data relating to the measured weight force are compared to digital data of the measured reference force and to digital data of the measured disturbance force and digital data of the measured surface profile. Furthermore, a correction of a weight force measured by the surface profile is performed, for example, by taking into account elevations or depressions in the surface profile.

In addition, the processing unit 31 sends digital data concerning the movement of the carriage 5, 5', 5" along the calibration path 14 to the data acquisition unit 30 where these digital data are converted in electrical signals. The data acquisition unit 30 accordingly sends electrical signals to the drive control unit 28 corresponding to the movement of the carriage 5, 5', 5" along the calibration path 14 driven by the drive unit 10. Thus, the data acquisition unit 30 transmits to the drive control unit 28, electrical signals relating to starting and stopping the movement of the carriage 5, 5', 5".

Preferably, the WIM sensor 3 inserted in the roadway 2 is calibrated at least once in a calibration direction parallel to the direction of travel as shown in FIG. 1 and is calibrated at least once in a calibration direction parallel to the longitudinal direction of the sensor as shown in FIG. 2. Preferably, the WIM sensor 3 inserted in the roadway 2 is calibrated in the form of a grid consisting of a plurality of calibration paths 14. In the grid, the calibration paths 14 extend parallel to one another and in a spacing of 20 mm to 200 mm between adjacent calibration paths 14 in such grid.

For the calibration direction extending parallel to the direction of travel, a WIM sensor 3 is calibrated for example with ten piezoelectric transducer elements having a spacing of 100 mm, preferably in a grid of calibration paths 14 with a spacing of 50 mm between adjacent calibration paths 14 in such grid. In this way, each piezoelectric transducer element is calibrated by moving the apparatus 1 over the WIM sensor 3 in the direction of travel in an area in which the piezoelectric transducer element is arranged, and in this case the piezoelectric transducer element will measure a large weight force. And furthermore, each piezoelectric transducer element is calibrated by moving the apparatus 1 over the WIM sensor 3 in the direction of travel in an area between two adjacent piezoelectric transducer elements, and in this case both piezoelectric transducer elements will measure the same weight force.

For the calibration direction extending parallel to the longitudinal direction of the WIM sensor 3 as shown in FIG. 2, a WIM sensor 3 having a width of 40 mm is preferably calibrated by a grid of calibration paths 14 with a spacing of 40 mm between adjacent calibration paths 14 in such grid. In this way, the WIM sensor 3 is calibrated by moving the apparatus 1 in the longitudinal direction of the sensor 3 exactly over the installation site of the WIM sensor 3 by which the WIM sensor 3 will measure a large weight force and, furthermore, every piezoelectric transducer of the WIM sensor 3 will measure a large weight force. And in addition, the WIM sensor 3 is calibrated by moving the apparatus 1 in the longitudinal direction of the sensor 3 at a distance of 40 mm from the installation site of the WIM sensor 3, and in this case the WIM sensor 3 will measure a small weight force and also every piezoelectric transducer of the WIM sensor 3 will measure a small weight force.

LIST OF REFERENCE NUMERALS 1 apparatus
2 roadway
3 WIM sensor
4 evaluation unit
5-5" carriage
6 position transducer
7 wheels for moving the base 131
9 surface profile sensor
10 drive unit
11 actuator
12 force sensor
13 frame
14 calibration path
15-15" applicator
16,16' position sensor
17-17''' foot
18-18''' cantilever arms
19 pneumatic pump
20 pneumatic valve
21 pneumatic control unit
22-22''' disturbance force sensor
25,25' electric power supply
26 vacuum pump
27 vacuum gauge
28 drive control unit
29 starter
30 data acquisition unit
31 processing unit
36 belt for drive unit 10
110 incremental encoder
131 base
132 longitudinal support
133 guide

What is claimed is:

1. An apparatus for calibrating a weigh-in-motion (WIM) sensor inserted in a site of installation in a roadway, the apparatus comprising:
an actuator that is configured to generate a reference force;
an applicator that is disposed with respect to the actuator to introduce the reference force into the roadway; and
a force sensor that detects a reference force and that is calibrateable using the reference force, the force sensor being disposed between the actuator and the applicator; and
a frame that is positionable in a stationary manner relative to the site of installation of the WIM sensor;
wherein the actuator, the force sensor and the applicator are mechanically connected to each other to form a carriage that is arranged in the frame and selectively moveable along a calibration path for calibrating the WIM sensor along the calibration path as the carriage moves along the calibration path.

2. The apparatus according to claim 1, wherein the frame comprises a base and a longitudinal support; wherein the base is arranged below the longitudinal support relative to a roadway; the longitudinal support comprises a guide rail; and the carriage moves along the calibration path in the guide rail.

3. The apparatus according to claim 1, wherein the apparatus comprises a drive unit; said drive unit being secured at the longitudinal support; and said drive unit moving the carriage along the calibration path.

4. The apparatus according to any of claim 1, wherein the base comprises a plurality of feet by which it is placeable on the roadway; and the base can be immobilized on the roadway by a vacuum between the feet and the roadway; and/or the base can be immobilized on the roadway by fixing weights.

5. An apparatus for calibrating a weigh-in-motion (WIM) sensor inserted in a roadway, the apparatus comprising:
an actuator that is configured to generate a reference force;
an applicator that is disposed with respect to the actuator to introduce the reference force into the roadway;
a force sensor that detects a reference force and that is calibrateable using the reference force, the force sensor being disposed between the actuator and the applicator;
a frame that is positionable in a stationary manner relative to a site of installation of the WIM sensor; and
wherein the actuator, the force sensor and the applicator are mechanically connected to each other to form a carriage that is arranged in the frame and selectively moveable along a calibration path;
wherein the WIM sensor is calibrateable along the calibration path, and the carriage moves along the calibration path;
wherein the apparatus comprises at least one position sensor; wherein the position sensor is a light emitter emitting a light beam in the visible range that can be projected onto the roadway; and a projection of the light beam onto the roadway defines a position on the calibration path.

6. The apparatus according to claim 5, wherein the frame comprises a guide; wherein the guide is arranged between the longitudinal support and the base; and the longitudinal support is positionable by means of the guide relative to the installation site of the WIM sensor.

7. The apparatus according to claim 1 wherein the apparatus comprises at least one surface profile sensor; wherein the surface profile sensor detects an alteration in a distance of the surface profile sensor to the surface of the roadway on the calibration path; and from alterations of the distance detected at different positions of the calibration path a surface profile of the roadway along the calibration path can be determined.

8. A method for calibrating along a calibration path a weigh-in-motion (WIM) sensor inserted in a roadway, the method comprising:
using an applicator to introduce along a calibration path a reference force in the roadway in which the WIM sensor to be calibrated is inserted;
using the WIM sensor at the site of installation of the WIM sensor to detect and measure the reference force as a weight force; and
using a force sensor to detect the reference force;
measuring the reference force detected by the force sensor;
comparing the weight force detected by the WIM sensor to the reference force that is measured;
using at least one position sensor to detect a position on the calibration path relative to the installation site of the WIM sensor; and
using a drive unit to move the applicator along the calibration path.

9. The method according to claim 8, wherein the reference force is generated by an actuator; wherein the actuator, force sensor and applicator are mechanically connected to each other forming a carriage, said carriage being moved along the calibration path by the drive unit.

10. The method according to claim 9, wherein a frame is provided at the installation site of the WIM sensor and said frame comprises a longitudinal support and a guide, wherein the longitudinal support is positioned by means of the guide relative to the installation site of the WIM sensor.

11. The method according to claim 8, wherein the WIM sensor inserted in the roadway is moved by a wide-wheeled applicator comprising a wheel that is wider than a width of the WIM sensor in a direction of travel; or the WIM sensor inserted in the roadway is moved by a narrow-wheeled applicator comprising a wheel of a width identical to that of the WIM sensor in a direction of travel; or the WIM sensor inserted in the roadway is moved by a punch-shaped applicator comprising a punch having a diameter identical to the width of the WIM sensor in a direction of travel.

12. The method according to claim 8, wherein a punch-shaped applicator comprising a punch is moved along the WIM sensor inserted in the roadway; wherein the WIM sensor comprises piezoelectric transducer elements and the punch is positioned at individual piezoelectric transducer elements; and wherein the piezoelectric transducer elements are individually calibrated against a pre-defined reference force ramp.

13. The method according to claim 12, wherein the reference force ramp comprises a plurality of reference forces with different amounts wherein the amount of the reference forces of the reference force ramp varies within one order of magnitude; and the reference force ramp is varied upwards or downwards at individual piezoelectric transducer elements.

14. The method according to claim 8, wherein that the WIM sensor inserted in the roadway is calibrated at least once in a calibration direction parallel to a direction of travel; the WIM sensor inserted in the roadway is calibrated at least once in a calibration direction parallel to a longitudinal direction of the sensor; and the WIM sensor inserted in the roadway is calibrated in the form of a grid consisting of a plurality of calibration paths, wherein said calibration paths extend parallel to each other in the grid.

* * * * *